United States Patent
Takahashi et al.

(10) Patent No.: US 9,129,184 B2
(45) Date of Patent: Sep. 8, 2015

(54) IMAGE SYNTHESIS PROCESSOR AND IMAGE SYNTHESIS METHOD

(71) Applicant: FUJITSU LIMITED, Kawasaki, Kanagawa (JP)

(72) Inventors: Jun Takahashi, Kawasaki (JP); Hiroshi Iwanaga, Fukuoka (JP); Kensuke Kuraki, Ichikawa (JP); Shohei Nakagata, Kawasaki (JP); Taizo Anan, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 14/032,532

(22) Filed: Sep. 20, 2013

(65) Prior Publication Data

US 2014/0023277 A1    Jan. 23, 2014

Related U.S. Application Data

(63) Continuation of application No. PCT/JP2011/056857, filed on Mar. 22, 2011.

(51) Int. Cl.
| | |
|---|---|
| G06K 9/36 | (2006.01) |
| H04N 21/44 | (2011.01) |
| H04N 21/4405 | (2011.01) |
| H04N 21/835 | (2011.01) |
| H04N 1/32 | (2006.01) |
| G06T 1/00 | (2006.01) |

(52) U.S. Cl.
CPC .............. *G06K 9/36* (2013.01); *G06T 1/0028* (2013.01); *H04N 1/32224* (2013.01); *H04N 1/32352* (2013.01); *H04N 21/4405* (2013.01); *H04N 21/44008* (2013.01); *H04N 21/44055* (2013.01); *H04N 21/835* (2013.01); *G06T 2201/0201* (2013.01); *G06T 2201/0202* (2013.01)

(58) Field of Classification Search
CPC ........... G06T 2207/20021; G06T 2207/20036; G06T 2207/20221
See application file for complete search history.

(56) References Cited

U.S. PATENT DOCUMENTS

| | | | |
|---|---|---|---|
| 5,726,435 A | 3/1998 | Hara et al. | |
| 7,047,410 B1 * | 5/2006 | Shin | .............................. 713/176 |
| 7,397,611 B2 | 7/2008 | Yuyama | |

(Continued)

FOREIGN PATENT DOCUMENTS

| | | |
|---|---|---|
| JP | 7-254037 | 10/1995 |
| JP | 2938338 | 8/1999 |

(Continued)

OTHER PUBLICATIONS (V Aslantas, "A Comparison of Criterion Functions for Fusion of Multi-Focus Noisy Images", 2009, Elsevier).*

(Continued)

*Primary Examiner* — Siamak Harandi
(74) *Attorney, Agent, or Firm* — Staas & Halsey LLP

(57) ABSTRACT

An image processor includes an image degradation measuring unit configured to compute a degradation level of block data with respect to each of blocks within an image, a degradation determining unit configured to select, with respect to each of the blocks within the image, the block data of a target block of one of a plurality of the images based on degradation levels of respective block data of the target blocks of the plurality of the images, and an image synthesis unit configured to generate a sheet of an image by synthesizing the block data selected with respect to the blocks within the image.

7 Claims, 17 Drawing Sheets

(56) References Cited

U.S. PATENT DOCUMENTS

2009/0257586 A1 10/2009 Takahashi et al.
2009/0323950 A1 12/2009 Nakagata et al.
2011/0229043 A1 9/2011 Kuraki et al.

FOREIGN PATENT DOCUMENTS

| JP | 2004-48445   | 2/2004  |
| JP | 2006-221365  | 8/2006  |
| JP | 2007-215091  | 8/2007  |
| JP | 2007-325199  | 12/2007 |
| JP | 2008-301044  | 12/2008 |
| JP | 2009-232129  | 10/2009 |
| JP | 4348381      | 10/2009 |
| JP | 2010-62694   | 3/2010  |
| JP | 2011-197902  | 10/2011 |

OTHER PUBLICATIONS (Shutao Li, "Combination of Images with Diverse Focuses using the Spatial Frequency", 2001, Elsevier).*

Patent Abstracts of Japan, Publication No. 2010-062694, Published Mar. 18, 2010.
Patent Abstracts of Japan, Publication No. 2004-048445, Published Feb. 12, 2004.
Patent Abstracts of Japan, Publication No. 2007-325199, Published Dec. 13, 2007.
Taizo Anan et al., "Paper Encryption Technology", Fujitsu, Sep. 10, 2009, vol. 60, No. 5, pp. 490-495, Partial (p. 493 left bottom column, line 24, and p. 494 left bottom column, line 19).
International Search Report of PCT/JP2011/056857 mailed Apr. 26, 2011.
Patent Abstracts of Japan, Publication No. 2006-221365, Published Aug. 24, 2006.
Japanese Office Action dated Dec. 16, 2014 in corresponding Japanese Patent Application No. 2013-505709.
Japanese Office Action mailed Jun. 24, 2014 in corresponding Japanese Patent Application No. 2013-505709.
Patent Abstracts of Japan, Publication No. 07-254037, Published Mar. 10, 1995.
Patent Abstracts of Japan, Publication No. 2008-301044, Published Dec. 11, 2008.

* cited by examiner

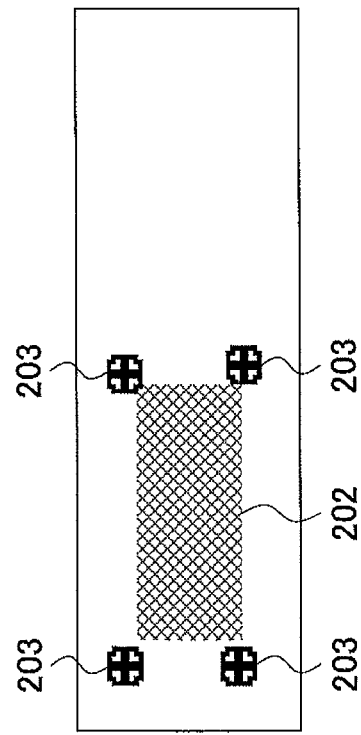
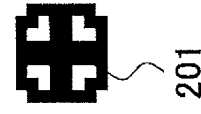

| INPUT IMAGE | CURRENT IMAGE DEGRADATION INFORMATION | PREVIOUS IMAGE DEGRADATION INFORMATION | IMAGE INFORMATION UTILIZED FOR SYNTHESIS | UPDATED IMAGE DEGRADATION INFORMATION |
|---|---|---|---|---|
| 1ST SHEET | 1.3 1.3 1.3<br>1.2 0.5 1.1<br>1.4 1.2 1.4<br>〜801 | 100 100 100<br>100 100 100<br>100 100 100<br>〜802 | 1 1 1<br>1 1 1<br>1 1 1<br>〜803 | 1.3 1.3 1.3<br>1.2 0.5 1.1<br>1.4 1.2 1.4<br>〜804 |
| 2ND SHEET | 1.4 1.3 1.3<br>1.3 1.2 1.1<br>1.2 0.6 0.4<br>〜805 | 1.3 1.3 1.3<br>1.2 0.5 1.1<br>1.4 1.2 1.4<br>〜806 | 1 1 1<br>1 1 1<br>2 2 2<br>〜807 | 1.3 1.3 1.3<br>1.3 0.5 1.1<br>1.2 0.6 0.4<br>〜808 |
| ⋮ | ⋮ | ⋮ | | |

FIG.17

| INPUT IMAGE | CURRENT IMAGE DEGRADATION INFORMATION | PREVIOUS IMAGE DEGRADATION INFORMATION | IMAGE INFORMATION UTILIZED FOR SYNTHESIS | UPDATED IMAGE DEGRADATION INFORMATION |
|---|---|---|---|---|
| 1ST SHEET | 1301: <br> 1.3 \| 1.3 \| 1.3 <br> 1.2 \| 0.5 \| 1.1 <br> 1.4 \| 1.2 \| 1.4 | 1302: <br> 100 \| 100 \| 100 <br> 100 \| 100 \| 100 <br> 100 \| 100 \| 100 | 1303: <br> 1 \| 1 \| 1 <br> 1 \| 1 \| 1 <br> 1 \| 1 \| 1 | 1304: <br> 1.3 \| 1.3 \| 1.3 <br> 1.2 \| 0.5 \| 1.1 <br> 1.4 \| 1.2 \| 1.4 |
| 2ND SHEET | 1305: <br> 1.4 \| 1.3 \| 1.3 <br> 1.3 \| 1.2 \| 1.1 <br> 1.2 \| 0.6 \| 0.4 | 1306: <br> 1.3 \| 1.3 \| 1.3 <br> 1.2 \| 0.5 \| 1.1 <br> 1.4 \| 1.2 \| 1.4 | 1307: <br> 1 \| 1 \| 1 <br> 1 \| 1 \| 1 <br> 2 \| 2 \| 2    (1309) | 1308: <br> 1.3 \| 1.3 \| 1.3 <br> 1.2 \| 0.5 \| 1.1 <br> 1.4 \| 1.2 \| 1.4 |
| ... | ... | ... | | |

IMAGE SYNTHESIS PROCESSOR AND IMAGE SYNTHESIS METHOD

CROSS-REFERENCE TO RELATED APPLICATIONS

This application is a continuation application of International Application PCT/JP2011/056857 filed on Mar. 22, 2011 and designated the U.S., the entire contents of which are incorporated herein by reference.

FIELD

The disclosures discussed herein generally relate to an image processor and an image processing method.

BACKGROUND

In the progress of information-oriented society, information leakage is increasingly becoming problematic. Specifically, technical development for preventing information leakage of paper media appears to be urgently required.

Japanese Patent No. 2938338 (Patent Document 1) discloses a two-dimensional code technology to attach binary data as an image to printed patter. This image is obtained by coding data in a two-dimensional matrix form. In this technology, positions of the code are detected by utilizing locating markers attached to the image, and code information is, after having been printed, read to decode the two dimensional image.

Japanese Patent No. 4348381 (Patent Document 2) discloses a technology to encrypt printed items. This technology is achieved by regularly converting image values of an area subject to encryption. Further, an image scanner detects the locating markers disposed at the time of encryption to specify the positions of the encrypted area so as to perform a decrypting process.

Japanese Laid-open Patent Publication No. 2009-232129 (Patent Document 3) discloses a technology to encrypt an image by dividing an image into plural blocks and scrambling the divided blocks. In this technology, boundary markers each indicating a boundary of the blocks are generated, and the generated boundary markers are embedded in the encrypted image so as to detect the position of each of the divided blocks of the degraded image. Note that the image captured by an apparatus such as a camera that images an encrypted image includes image degradation such as image blur due to camera shaking. Japanese Patent Application No. 2010-062694 (Patent Document 4) discloses a technology to eliminate parts having the above-described image degradation from the captured image. More specifically, the technology disclosed in Patent Document 4 identifies the degrees of the image blur based on the edge features of the locating markers to eliminate the blurred image.

In the rolling shutter system of a complementary metal-oxide semiconductor (CMOS) sensor such as digital still cameras, an image acquisition time for imaging a sheet of an image differs in each line. Hence, the degrees of camera shaking differ in each of imaged areas. Further, the sheet of the image may partially include out-of-focus areas due to three-dimensional distortion. Such a sheet of the image that partially includes image blur or image wobble is determined as being inappropriate for decoding, and will not be employed for the decoding process. Accordingly, a longer waiting time may be required for performing the decoding process until the image having no degradation is acquired. In this technology, it may be inevitable to decode the image having degradation areas when reduction in the waiting time is required. As a result, the information to be read may result in degraded information.

RELATED ART DOCUMENTS

Patent Documents

Patent Document 1: Japanese Patent No. 2938338
Patent Document 2: Japanese Patent No. 4348381
Patent Document 3: Japanese Laid-open Patent Publication No. 2009-232129
Patent Document 4: Japanese Patent Application No. 2010-062694

SUMMARY

According to an aspect of an embodiment, there is provided an image processor that includes an image degradation measuring unit configured to compute a degradation level of block data with respect to each of blocks within an image; a degradation determining unit configured to select, with respect to each of the blocks within the image, the block data of a target block of one of a plurality of the images based on degradation levels of respective block data of the target blocks of the plurality of the images; and an image synthesis unit configured to generate a sheet of an image by synthesizing the block data selected with respect to the blocks within the image.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIGS. 6A and 6B are diagrams illustrating examples of position detecting markers;

FIG. 12 is a diagram illustrating an example of a process performed by a degradation determining part;

FIG. 17 is a diagram illustrating an example of the process performed by the degradation determining part in FIG. 15.

DESCRIPTION OF EMBODIMENTS

In the following, preferred embodiments are described with reference to the accompanying drawings.

Figure 1:
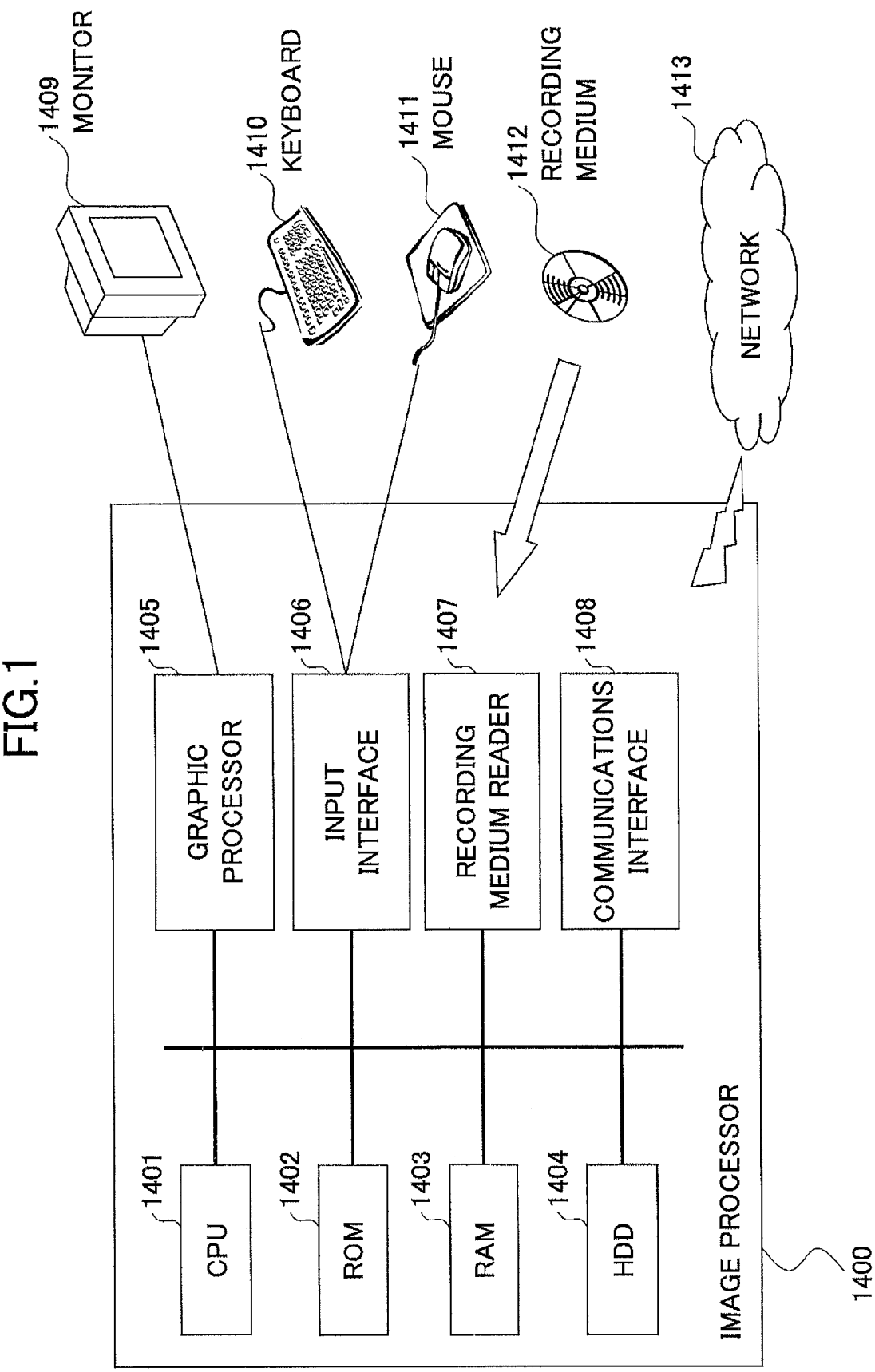
FIG. 1 is a diagram illustrating an example of a hardware configuration of an image processor.

FIG. 1 is a diagram illustrating an example of a hardware configuration of an image processor 1400. The image processor 1400 includes a central processing unit (CPU) 1401, a read only memory (ROM) 1402, a random access memory (RAM) 1403, and a hard disk drive (HDD) 1404. The image processor 1400 further includes a graphic processor 1405, an input interface 1406, a recording medium reader 1407, and a communications interface 1408.

The CPU 1401 is configured to control the overall image processor 1400. The ROM 1402 is configured to store a basic input/output system (BIOS) program and the like. The RAM 1403 is configured to temporarily store at least a part of programs of an operating system (OS) or application software (hereinafter called "applications") to be executed by the CPU 1401. The RAM 1403 is configured to store various data required for a process to be executed by the CPU 1401.

The HDD 1404 is configured to store OS programs or application programs. The HDD 1404 is configured to store various data required for a process to be executed by the CPU 1401. Note that other types of storage units such as a solid state drive may be used in place of or in addition to the HDD 1404.

The graphic processor 1405 is connected to a monitor 1409. The graphic processor 1405 is configured to display images on the screen of the monitor 1409 in accordance with the instructions from the CPU 1401. The input interface 1406 is connected to a keyboard 1410 and a mouse 1411. The input interface 1406 is configured to transmit signals received from the keyboard 1410 and the mouse 1411 to the CPU 1401.

The recording medium reader 1407 is configured to read data stored in a recording medium 1412. For example, functions included in the image processor 1400 may be implemented by causing a computer to execute a program describing process contents of the functions. The programs may be recorded in the non-transitory computer-readable recording medium 1412 to be distributed as a recording medium. Alternatively, the programs may be stored in a not-illustrated program delivery server connected to a network 1413. In this case, the image processor 1400 download the programs from the program delivery server via the network 1413.

Examples of the recording medium 1412 include a magnetic recorder, an optical disk, a magneto-optical medium, and semiconductor memory. Examples of the magnetic recorder include a hard disk drive (HDD), a flexible disk (FD), and a magnetic tape. Examples of the optical disk include a compact disk (CD), a CD recordable/rewritable (CD-R/RW), a digital versatile disk (DVD), and a DVD recordable/rewritable/random-access-memory (DVD-R/RW/RAM). Examples of the magneto-optical medium include a magneto-optical (MO) disk, and the like. Examples of the semiconductor memory include a universal serial bus (USB) memory, and the like.

Figure 2:
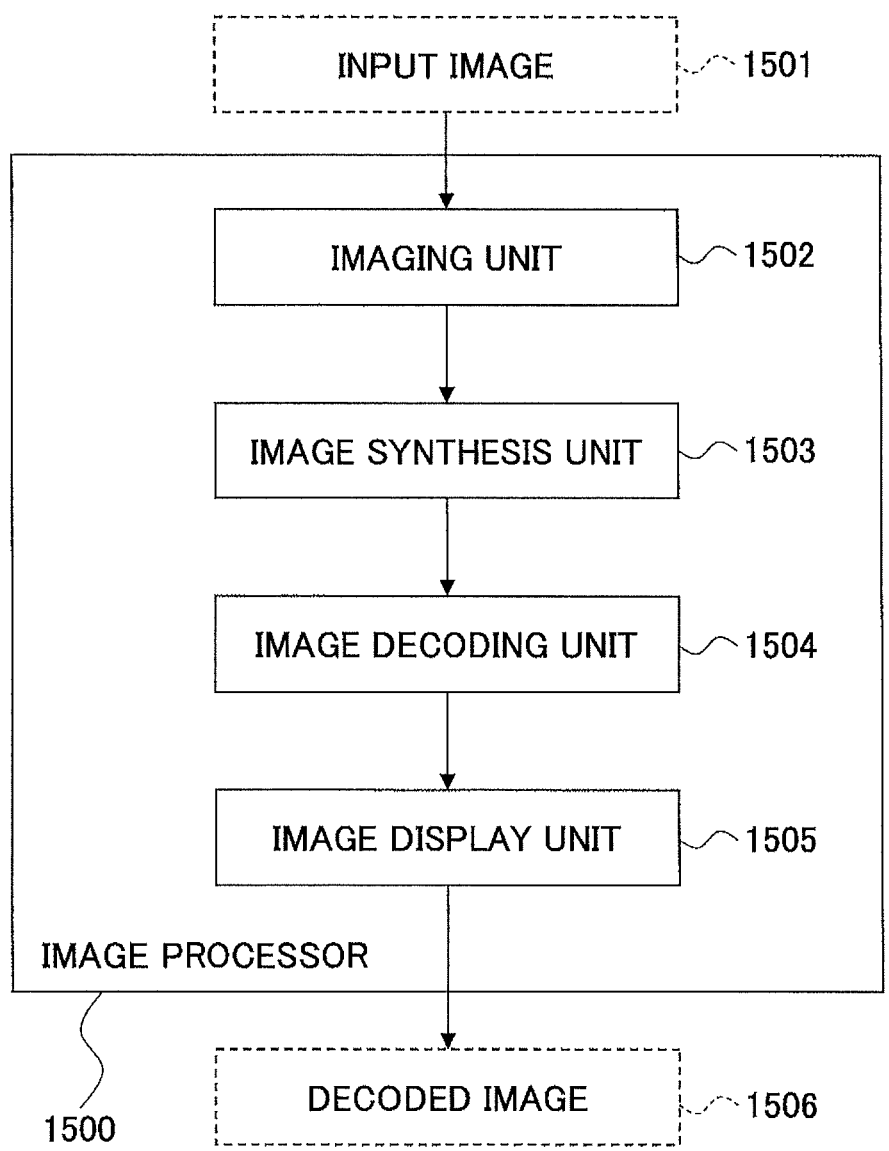
FIG. 2 is a diagram illustrating an example of a functional block configuration of an image processor.

FIG. 2 is a diagram illustrating an example of a functional block configuration of an image processor 1500. The image processor 1500 includes an imaging unit 1502, an image synthesis unit 1503, an image decoding unit 1504, and an image display unit 1505. Note that in the subsequent drawings similar to that of FIG. 2, a box indicating the boundary between one functional block and other functional blocks is a fundamental functional boundary, and hence, does not necessarily indicate the separation of physical positions, separation of electric signals, or separation of control logic. In hardware, each of the functional blocks may indicate a hardware module that is physically separated from other blocks to a certain extent, or may indicate a function of a hardware module that is physically integrated with other blocks. In software, each of the functional blocks may indicate a software module that is logically separated from other blocks to a certain extent, or may indicate a function of a software module that is logically integrated with other blocks.

The imaging unit 1502 is configured to incorporate an input image 1501 as image data into the image processor 1500. Examples of the imaging unit 1502 include a camera, a scanner and the like. The image synthesis unit 1503 is configured to synthesize plural input images incorporated by the imaging unit 1502 to output a sheet of a synthetic image. The image decoding unit 1504 is configured to decode an encoded area with a predetermined key utilizing a method disclosed, for example, in Patent Document 2 or 3. The key used for decoding the encoded area in the image decoding unit 1504 may be stored in memory in advance. Alternatively, a user may be prompted to input a key phrase serving as a key when the decoding process is carried out. The image display unit 1505 is configured to display a decoded image decoded by the image decoding unit 1504.

Figure 3:
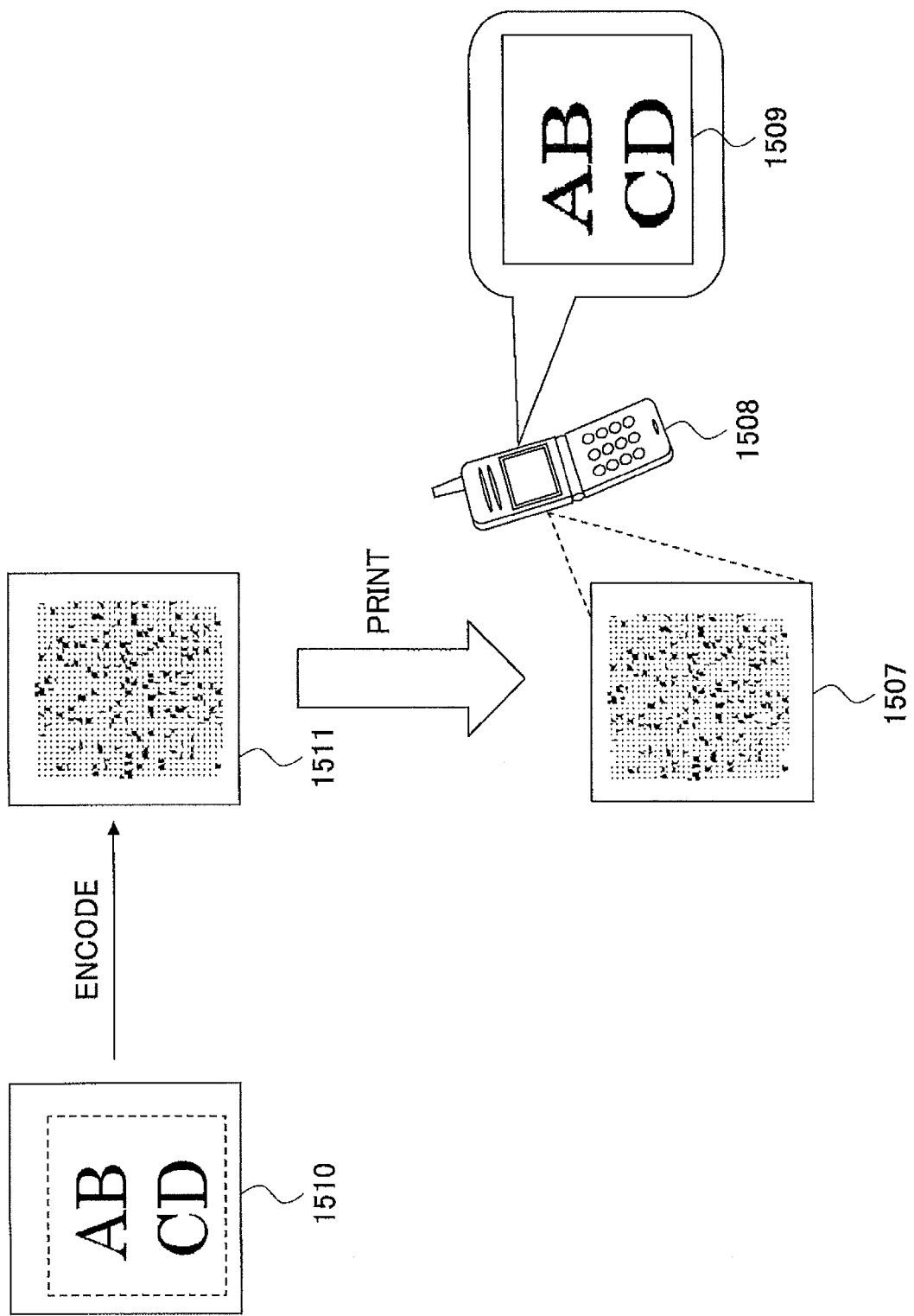
FIG. 3 is a diagram illustrating operations of a camera cell-phone having the image processor illustrated in FIG. 2.

FIG. 3 is a diagram illustrating operations of a camera cell-phone having the image processor 1500 illustrated in FIG. 2. The image decoding unit 1504 is configured to create an encoded image 1511 from an input image 1510 to generate a printout 1507 by utilizing the method disclosed, for example, in Patent Document 2 or 3. The camera (i.e., the imaging unit 1502 in FIG. 2) attached to a camera cell-phone 1508 is configured to image the printout 1507. The image synthesis unit 1503 and the image decoding unit 1504 (see FIG. 2) inside the camera cell-phone 1508 are configured to carry out an image synthesis process and an image decoding process, respectively, so as to present a decoded result 1509 on a display or the like of the camera cell phone 1508. In this example, the decoded result 1509, which is obtained by decoding the encoded image on the printout 1507, is presented as "ABCD" on the display or the like of the camera cell-phone 1508.

Figure 4:
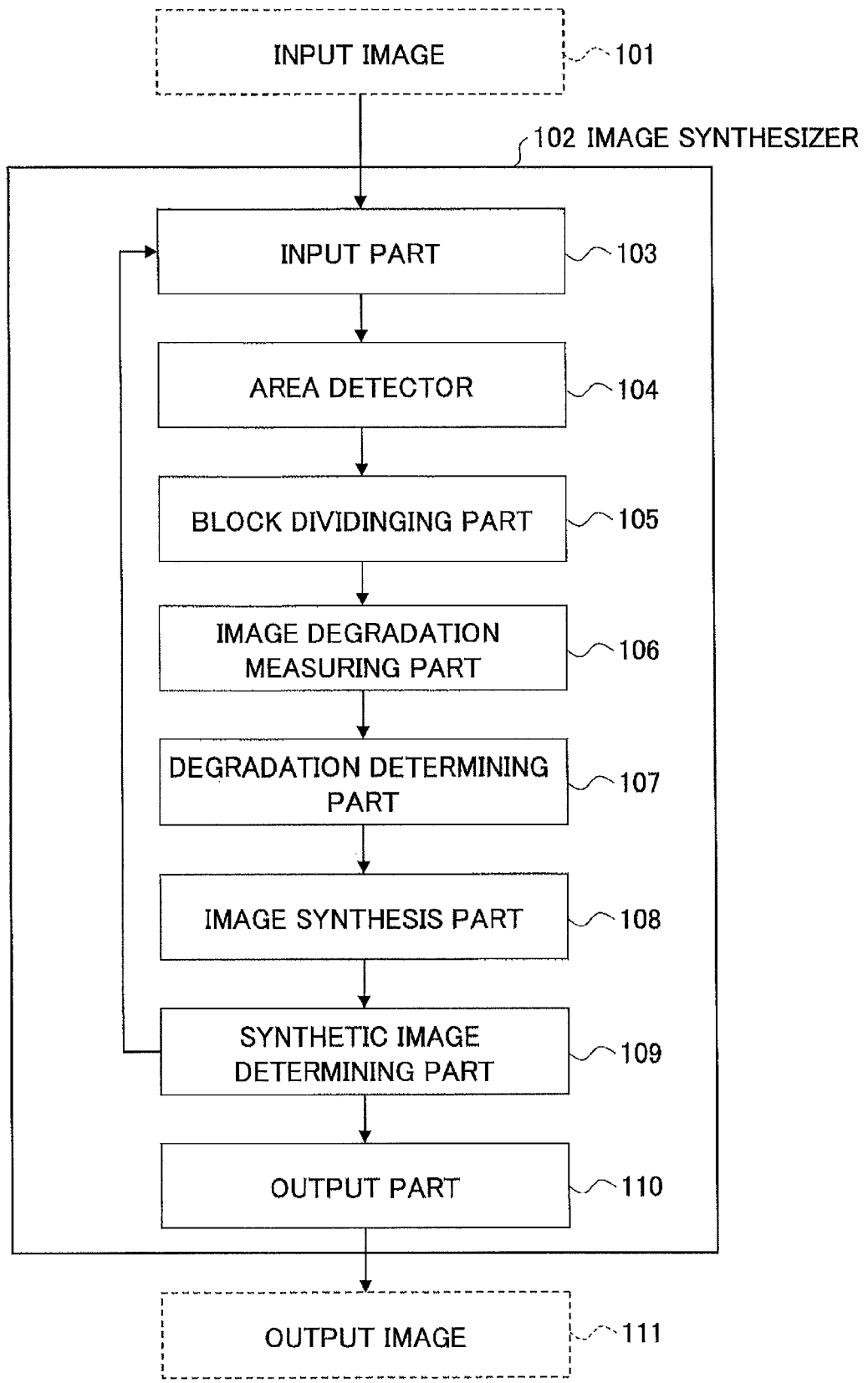
FIG. 4 is a diagram illustrating an example of a functional configuration of an image synthesizer.
Figure 5:
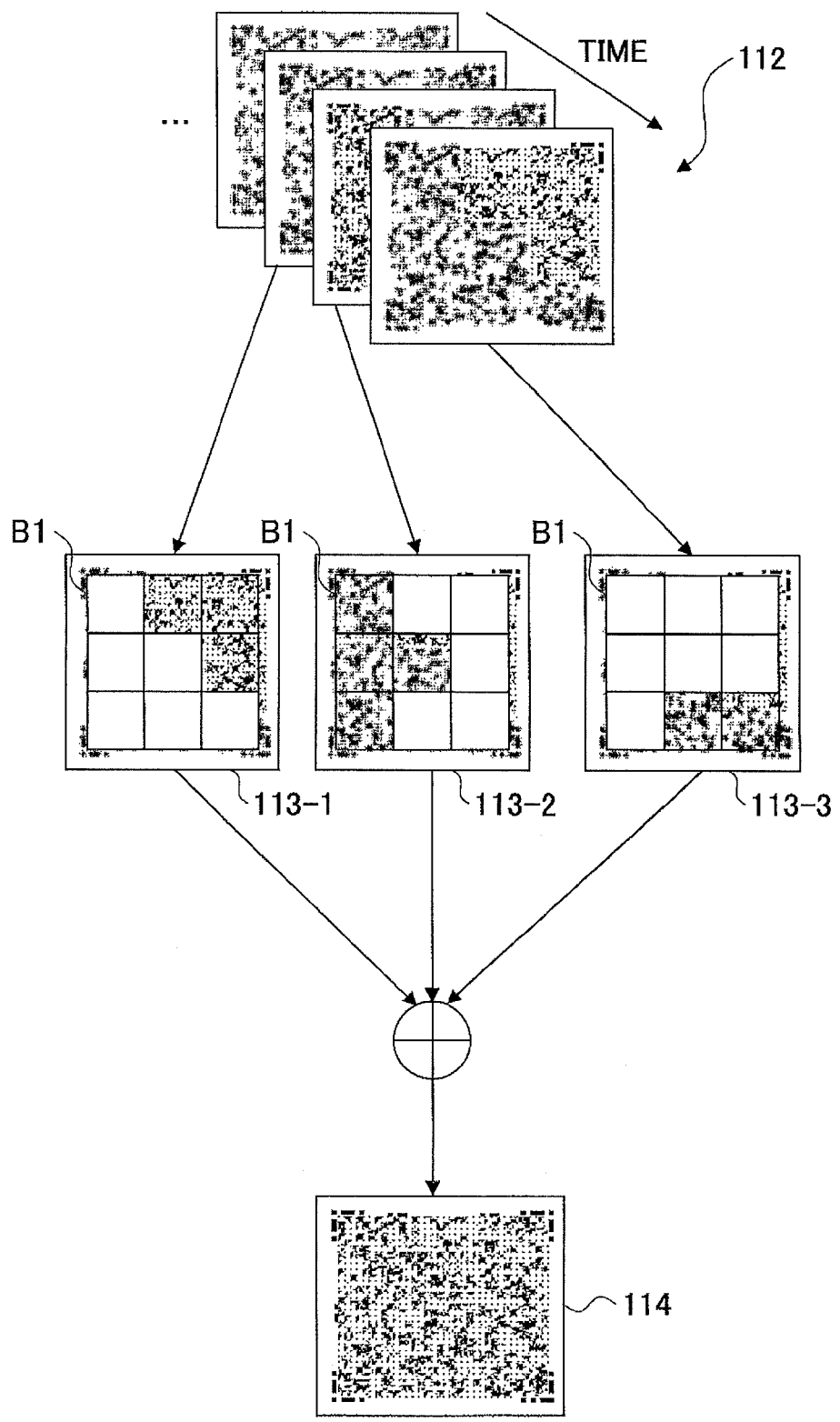
FIG. 5 is a diagram illustrating operations of the image synthesizer in FIG. 4.

FIG. 4 is a diagram illustrating an example of a functional configuration of an image synthesizer 102. FIG. 5 is a diagram illustrating operations of the image synthesizer 102 in FIG. 4. The image synthesizer 102 in FIG. 4 corresponds to the imaging unit 1502 and the image synthesis unit 1503 in FIG. 2. The image synthesizer 102 includes an input part 103, an area detector 104, a block dividing part 105, an image degradation measuring part 106, a degradation determining part 107, an image synthesis part 108, a synthetic image determining part 109, and an output part 110. The input part 103 is, for example, configured to capture an encoded image or the like of the printout 1507 illustrated in FIG. 3 to incorporate an input image 101.

Initially, a description will be given of an outline of image synthesis operations of the image synthesizer 102 in FIG. 4 with reference to FIG. 5. The input part 103 such as a camera or the like of the image synthesizer 102 captures an input image (an image subject to imaging) 101 to acquire plural sheets of image data taken at different times, which are represented as input image data 112 in FIG. 5. The image degradation measuring part 106 of the image synthesizer 102 is configured to compute a degradation level of block data of each of blocks of an image, utilizing plural sheets of image data. Specifically, when the image is, for example, divided into 3×3 blocks, the image degradation measuring part 106 determines a blurred level (i.e., an image degradation level) of each of block data of a total 9 blocks in each of the plural input images 112 illustrated in FIG. 5. Subsequently, with respect to each of the blocks within an image, the degradation determining part 107 selects block data of a target block of one of the images based on degradation levels of respective block data of target blocks of the plural images. For example, when a block B1 located on an upper left hand side is determined as the target block, the degradation determining part 107 compares degradation levels of block data between the respective target blocks B1 of the plural input images 112 so as to select one having the least degradation (least degradation level) of block data of the target blocks B1 of the respective input images 112. In the example of FIG. 5, the block data of the target block B1 of the image 113-2 is selected from the images 113-1 to 113-3 as the block data of the target block B1 having the least degradation. The image synthesis part 108 generates a sheet of an image by synthesizing the selected block data of the respective blocks based on the selected result. In the example schematically illustrated in FIG. 5, block data of three blocks on the upper right hand side are selected from the image 113-1, block data of three blocks on the left hand side column and block data of a central block are selected from the image 113-2, and block data of two blocks on the lower right hand side are selected from the image 113-3. The image synthesis part 108 is configured to generate a sheet of a synthetic image 114 by stitching (combining) the selected blocks.

In the following, a description is given of details of the operations of the image synthesizer 102.

The original input image 101 before being encoded may, for example, be divided into plural blocks and the divided blocks are scrambled by rearranging positions of the divided blocks, as disclosed in Patent Document 2 or 3. In addition, pixel values of a part of the blocks (e.g., an upper left corner of each of the blocks) may be converted in compliance with a predetermined rule to detect the positions of the blocks, or position-detecting markers may be attached to an image to detect the position of an image area. For example, the input image 101 may be acquired by attaching the position detecting markers to four corners of the image.

FIGS. 6A and 6B are diagrams illustrating examples of the position detecting markers. A marker 201 may have a specific pattern of a shape illustrated as an example in FIG. 6A. As illustrated in FIG. 6B, the position of an image area 202 including an encoded image may be specified by attaching position detecting markers 203 to the four corners of the image area 202.

Referring back to FIG. 4, the area detector 104 detects the image area within the imaged data of the input image 101 based on the position detecting markers. The block dividing part 105 divides the area detected image area into plural blocks. Note that pixel values of specific positions of the input image 101 subject to imaging (e.g., the image printed on the printout 1507 in FIG. 3) are converted in advance so as to detect the positions of the blocks.

Figure 7:
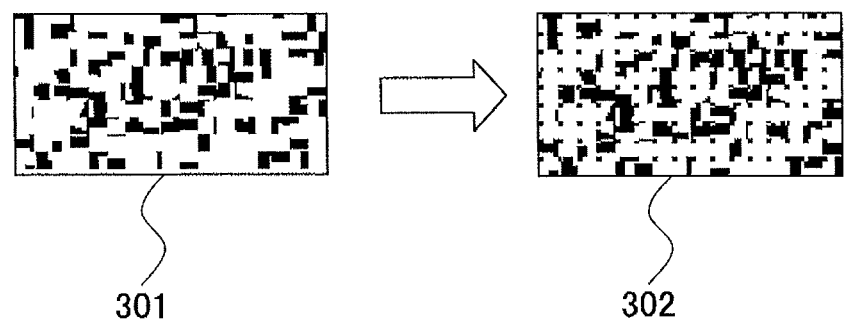
FIG. 7 is a diagram illustrating changes of pixel values for detecting a block position.

FIG. 7 is a diagram illustrating changes of pixel values for detecting a block position. An image 301 has unconverted pixel values and an image 302 has converted pixels. For example, pixel values of a 2×2 dot matrix on the upper left corner of each of the blocks is converted such that the converted pixel values serves as a "boundary marker" indicating the boundary of each of the blocks. Note that the pixel value conversion may be implemented by turning black pixels white and vice versa or shifting the pixels.

Figure 8B:
FIGS. 8A to 8D are diagrams illustrating detection of blocks.
Figure 8A:
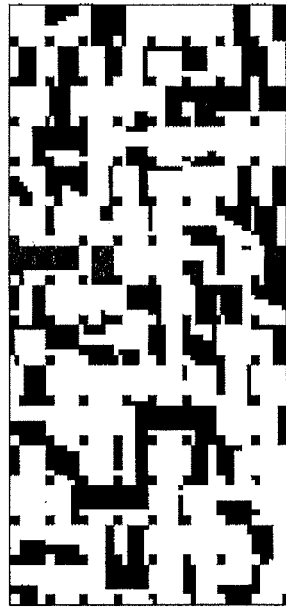
Figure 8D:
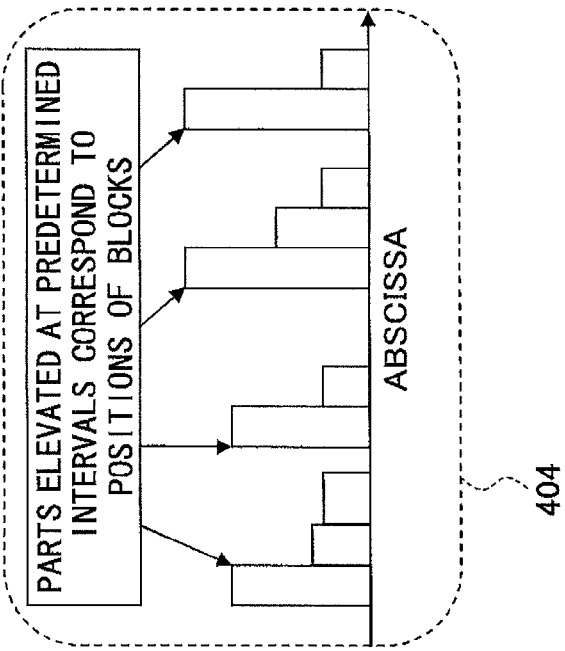
Figure 8C:
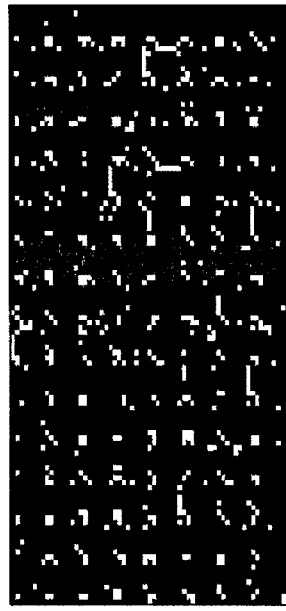

FIGS. 8A to 8D are diagrams illustrating detection of blocks. An image 401 illustrated in FIG. 8A is an input image including a pixel having a converted pixel such that the image 401 includes a boundary marker indicating the boundary of the block. An image 402 illustrated in FIG. 8B is obtained by applying a median filter (the filter to output a median obtained based on the target pixel and pixels peripheral to the target pixel) to the image 401. In the image 402, pixels having a converted pixel value (i.e., the pixels serving as the boundary marker) are removed by the median filter. FIG. 8C illustrates a difference image 403 between the image 401 and the image 402. The difference image 403 includes noise; however, the difference image 403 includes pixels having the converted pixel values (i.e., the pixels serving as the boundary marker) alone. FIG. 8D illustrates a histogram 404 representing the pixel values of the difference image 403, which are accumulated in the respective columns in the column direction. The histogram 404 includes accumulated values of the pixel values that are elevated at predetermined intervals. The positions of the peaks at predetermined intervals correspond to the boundary positions having the boundary marker pixels in directions of the block columns. Further, the boundary positions having the boundary marker pixels in directions of the block rows may be computed by the execution of operations similar to the above in the directions of the block rows. Hence, it may be possible to divide the image into plural blocks based on these boundary positions information items.

Referring back to FIG. 4, the image degradation measuring part 106 computes a data degradation level of block data for each of the blocks within the image. Specifically, the image degradation measuring part 106 is configured to compute image degradation level of the block data either for each of the blocks divided by the block dividing part 105, or for a large block integrating plural blocks. The degradation level is an index for indicating how much the image is degraded compared to the input image prior to being encoded.

Figure 9A:
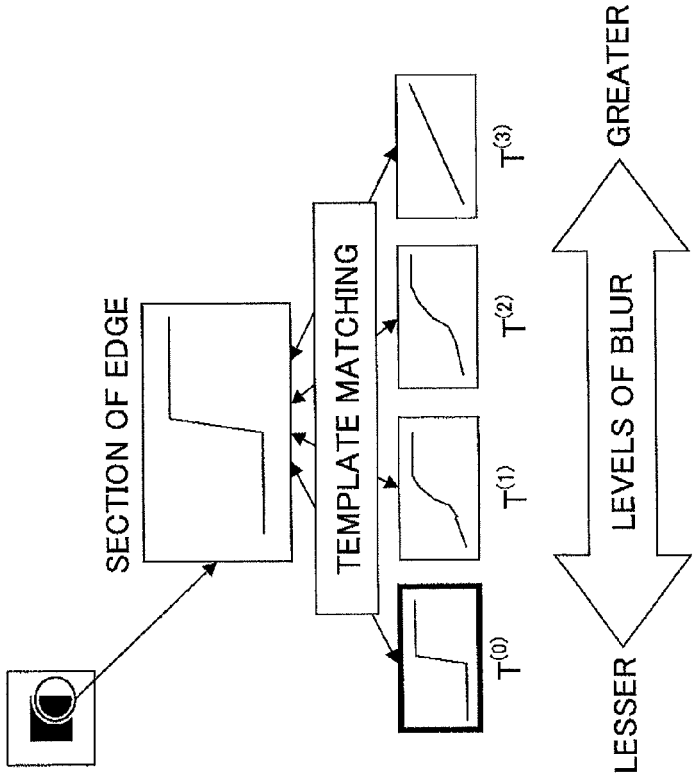
FIGS. 9A and 9B are diagrams illustrating an example for measuring a degradation level by performing pattern matching between templates and an image edge.
Figure 9B:
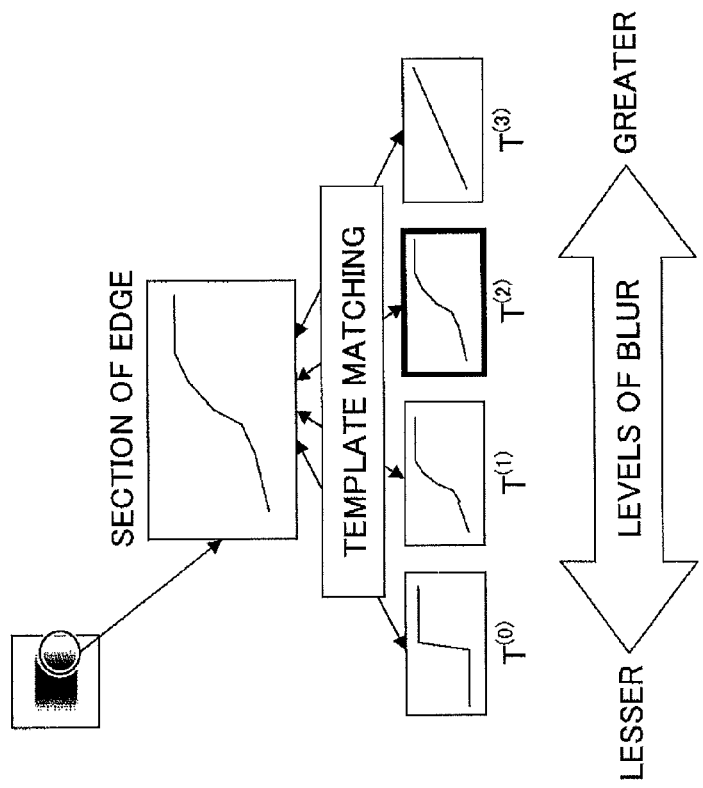

FIGS. 9A and 9B are diagrams illustrating an example for measuring a degradation level by performing pattern matching between templates and an image edge. When pixel values are defined by f(x, y), and a degraded model (blurring function) is defined by h(x, y) in the coordinate system (x, y), the degraded image is represented by the following formula (1).

$$g(x,y) = h(x,y) * f(x,y) \tag{1}$$

The degraded model may employ the following Gaussian function (see the following formula (2)).

$$h(x, y) = \frac{1}{2\pi\sigma^2} \exp\left(-\frac{x^2 + y^2}{2\sigma^2}\right) \tag{2}$$

The greater a σ value of the Gaussian function is, the greater the degradation level will be. Plural camera shake-blurring templates T(0) to T(3) are prepared by applying plural σ values of the Gaussian function. The template T(0) is obtained by applying a minimum σ value (i.e., the least degradation level) whereas the template T(3) is obtained by applying a maximum σ value (i.e., the greatest degradation level). Then, pattern matching is conducted between the edge of the input image and the prepared plural templates T(0) to T(3), and the σ value corresponding to the template closest to the result of the pattern matching is output as image degradation information. The pattern matching may be conducted as follows utilizing the following formula (3). For example, the edge of the image is determined as an n-dimensional vector v1, and values of the templates T(0) to T(3) in the coordinate system (x, y) are determined as T(0)(x, y) to T(3)(x, y), respectively, to compute the following formula (3).

$$\iint_S (g(x,y)-T^{(n)}(x,y))^2 dxdy \qquad (3)$$

In the formula (3), n=0, 1, 2, and 3, and S represents an image range. When the template matches the edge, the computation of the formula (3) results in 0. Hence, the template with which the computation of the formula (3) results in the smallest value is determined as the template having a a pattern closest to the result of the pattern matching.

In the example of FIG. 9A, a blurred image edge is input and the template T(2) is determined as the template having a pattern closest to the result of the pattern matching. In this case, the degradation level is relatively high. In the example of FIG. 9B, a sharp image edge is input and the template T(0) is determined as the template having a pattern closest to the result of the pattern matching. In this case, the degradation level is relatively low.

Figure 10:
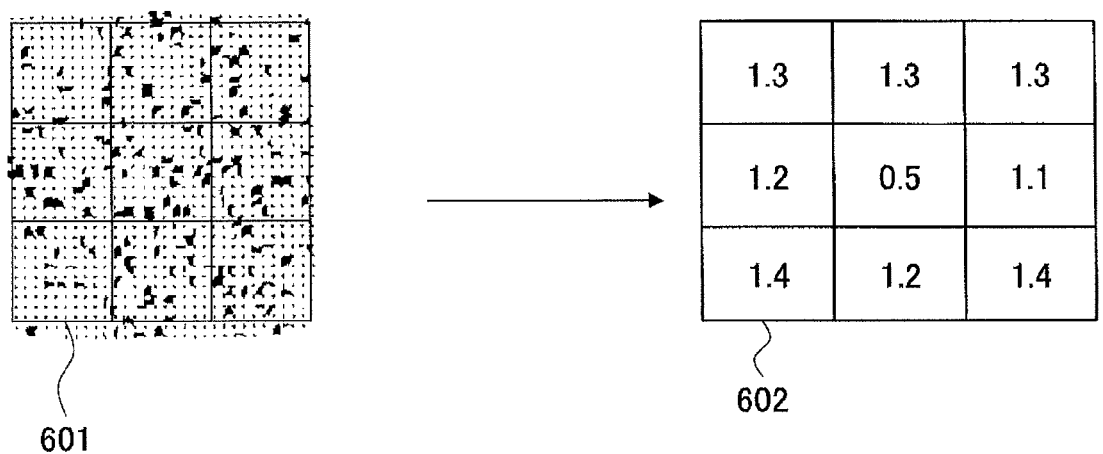
FIG. 10 is a diagram illustrating examples of degradation levels of the blocks of an image computed by an image degradation measuring part.

FIG. 10 is a diagram illustrating an example of a degradation level of each of the blocks of an image computed by an image degradation measuring part. In FIG. 10, an input image 601 is divided by 3×3 in a matrix, resulting in a total number of 9 blocks. Then, the degradation level with respect to each of the blocks is generated from the image degradation measuring part 106 as image degradation information 602. In the example of FIG. 6, the smaller the value of the degradation level of the image degradation information 602 is, the smaller the degradation will be.

In the following, a description is given of an example in which an image is divided into a 3×3 matrix as illustrated in FIG. 10, where the smaller the value of the degradation level of the image degradation information, the smaller the degradation will be. The number of blocks obtained by dividing the image is not limited to 9 as illustrated in the example, but the number of blocks may be any number of blocks insofar as the divided blocks have appropriate sizes. In this case, the blocks may be detected based on the boundary markers, or alternatively, the blocks may be a larger sized block integrating plural blocks detected based on the boundary markers as illustrated earlier in FIGS. 8A to 8D.

Referring back to FIG. 4, the degradation determining part 107 compares the image degradation information (degradation data for each block) of the current image obtained from the image degradation measuring part 106 and the image degradation information of the previously input images for each of the blocks within the image. The degradation determining part 107 determines which one of the input images is used for selecting the block data used for synthesis, for each of the blocks.

Figure 11:
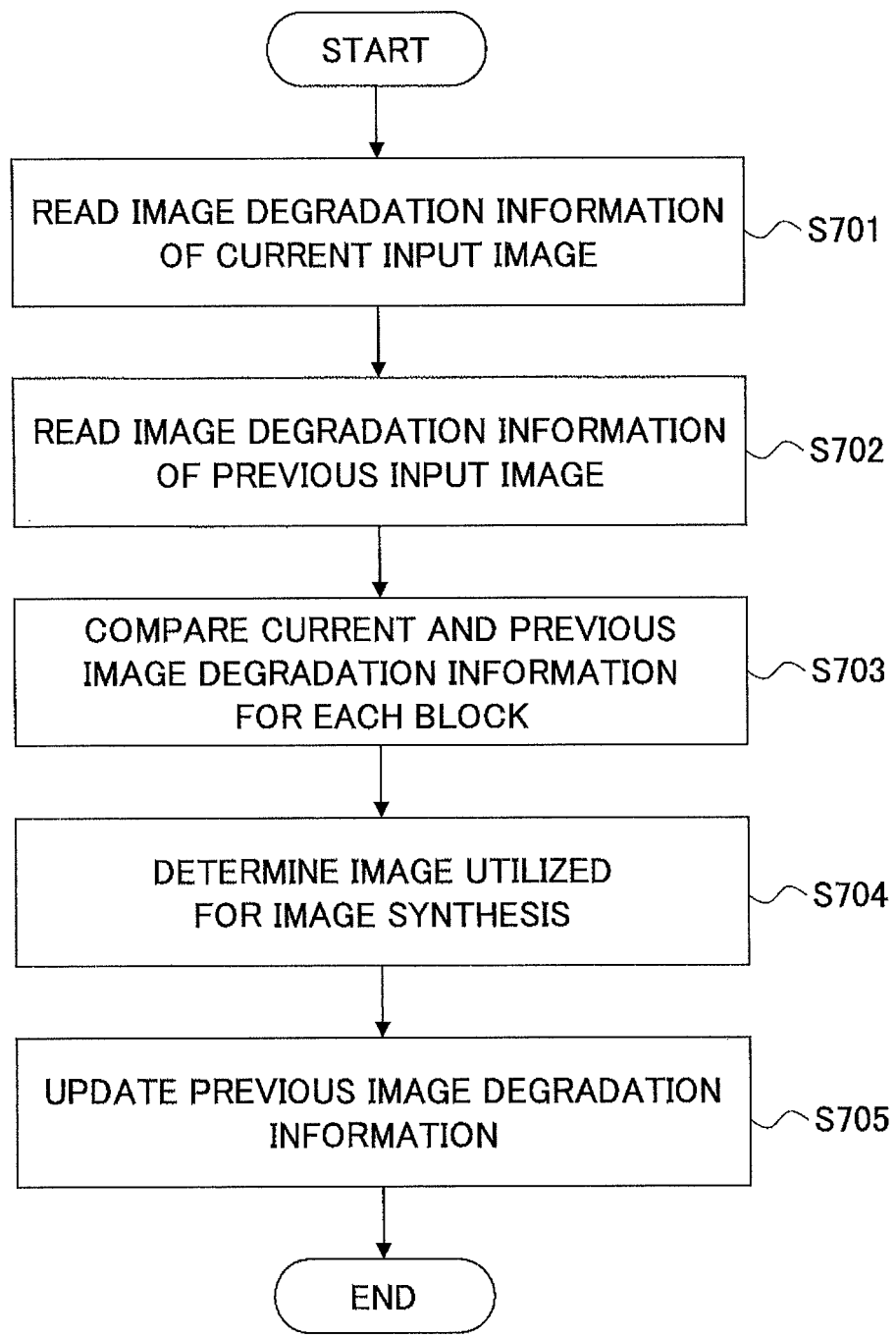
FIG. 11 is a flowchart illustrating a degradation determining process.

FIG. 11 is a flowchart illustrating a degradation determining process. In step S701, first image degradation information (i.e., data indicating a degradation level for each block) of the current input image data is read. In step S702, second image degradation information (i.e., data indicating a degradation level for each block) based on the previously input images is read. In step S703, the first image degradation information and the second image degradation information are compared for each of the blocks. In step S704, the image for use in image synthesis is determined based on the compared result. In this case, the image data corresponding to one of the first and the second image degradation information items having the degradation less than the other may be selected for use in the image synthesis. In step S705, the previous image gradation information (i.e., the second image degradation information) is updated. For example, the image degradation information (i.e., the second image degradation information) is replaced with degradation level data corresponding to one of the first and the second image degradation information items having the degradation less than the other, for each of the blocks. Hence, the degradation determining process performed by the degradation determining part 107 compares the degradation level of the target block data selected from the previous images and the degradation level of the target block data of the current image so as to determine one of the target block data to select based on the compared result.

FIG. 12 is a diagram illustrating an example of the process performed by the degradation determining part 107. Initially, the current image degradation information 801 and the previous image degradation information 802 are compared for each of the blocks, with respect to a first sheet of an input image. Note that when the first sheet of the input image is subject to the comparing process, there exists no previous image degradation information. Hence, in this case, a greater value (=100) is given as a default (i.e., an initial value) for previous image degradation information 802. Image information 803 for use in image synthesis is generated based on the comparing process for each of the blocks, such that the degradation of the synthetic image is reduced. The image information 803 indicates which sheet number of the image is used as image data of a corresponding block for synthesis, for each of the blocks. The image information 803 required with respect to the first sheet of the input image is "1" for all the blocks of the first sheet of the input image. That is, data of each of the blocks used in the synthetic image all correspond to data of the input image of the first sheet. Finally, image degradation information 804 is updated. The image degradation information 804 indicates the image degradation information (i.e., the degradation level) of the image data of each of the blocks indicted by the image information 803.

Subsequently, the current (i.e., a second sheet of an input image) image degradation information 805 and previous image degradation information 806 are compared for each of the blocks, with respect to the second sheet of the input image. The previous degradation image information 806 is identical to the image degradation information 804. Image information 807 for use in image synthesis is generated based on the comparing process for each of the blocks, such that the degradation of the synthetic image is reduced. The image information 807 indicates which sheet number of the image is used as image data of a corresponding block for synthesis, for each of the blocks. The image information 807 required with respect to the second sheet of the input image is "2" for three blocks in a lower row and "1" for remaining blocks other than the three blocks. That is, in the synthetic image, data of the three blocks in the lower row correspond to the data of the input image of the first sheet, whereas the data of the remaining blocks other than the three blocks correspond to the data of the input image of the second sheet. Finally, the image the image degradation information 805 is generated by updating the image the image degradation information 804. Image degradation information 808 indicates the image degradation information (i.e., the degradation level) of the image data of each of the blocks indicted by the image information 807. Thereafter, a similar process is conducted with respect to the sequentially input image to thereby update the image information for use in the image degradation information and the synthesis.

Referring back to FIG. 4, image synthesis part 108 normalizes the sizes and the shapes of all the blocks of the image determined by the degradation determining part 107 as being for use in the synthesis, and subsequently synthesizes an output image by stitching the normalized blocks. Note that the blocks are normalized for accurately stitching the blocks one to another by eliminating distortion despite the fact that the image includes the distortion in accordance with imaging conditions such as a camera and the like. The normalization may, for example, be executed utilizing affine transformation.

Figure 13:
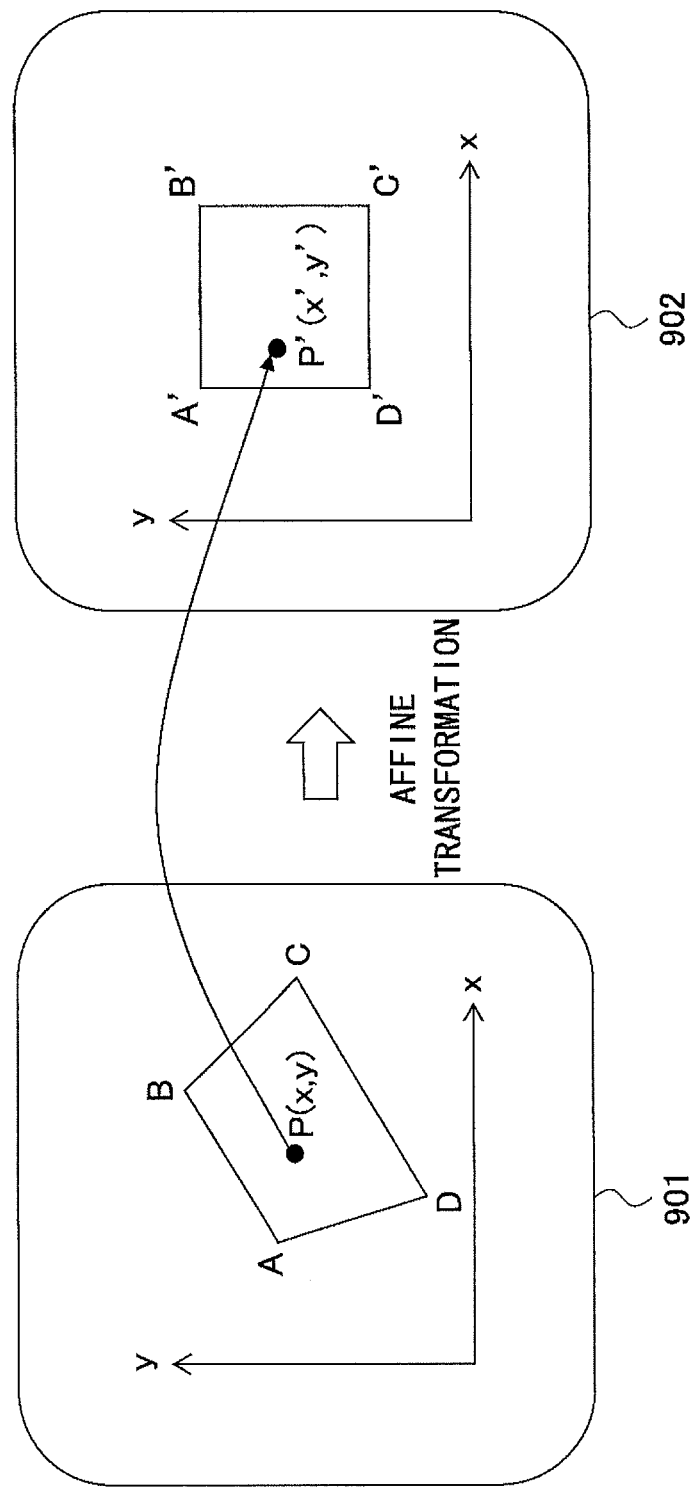
FIG. 13 is a diagram illustrating affine transformation.

FIG. 13 is a diagram illustrating affine transformation. When a certain point P(x, y) in an area indicated by A, B, C, and D of an image 901 is transformed by affine transformation into a certain point P'(x', y') in an area indicated by A', B', C', and D' of an image 902, such transformation is represented by the following transformation formula (4).

$$\begin{cases} x' = ax + cy + t_x \\ y' = bx + dy + t_y \end{cases} \quad (4)$$

Note that a, b, c, d, tx, and ty represent coefficients of affine transformation. The area indicated by the A, B, C, and D corresponds to a block prior to normalization, whereas the area indicated by the A', B', C', and D' corresponds to a block after normalization. In this case, the coefficients a, b, c, d, tx, and ty are computed based on the block prior to normalization (i.e., the area indicated by A, B, C, and D) and the block after normalization (i.e., the area indicated by the A', B', C', and D'). The coordinates of the four corners of the block prior to normalization (i.e., the area indicated by A, B, C, and D) may, for example, be computed based on the coordinates of the divided blocks divided by the area detector 104 and the block dividing part 105. Further, the coordinates of the four corners of the block after normalization (i.e., the area indicated by A', B', C', and D') may, for example, be easily determined based on the positions of the blocks in the synthetic image. When the normalization is appropriately conducted, the blocks may simply be stitched by copying the data or the like in memory.

Figure 14:
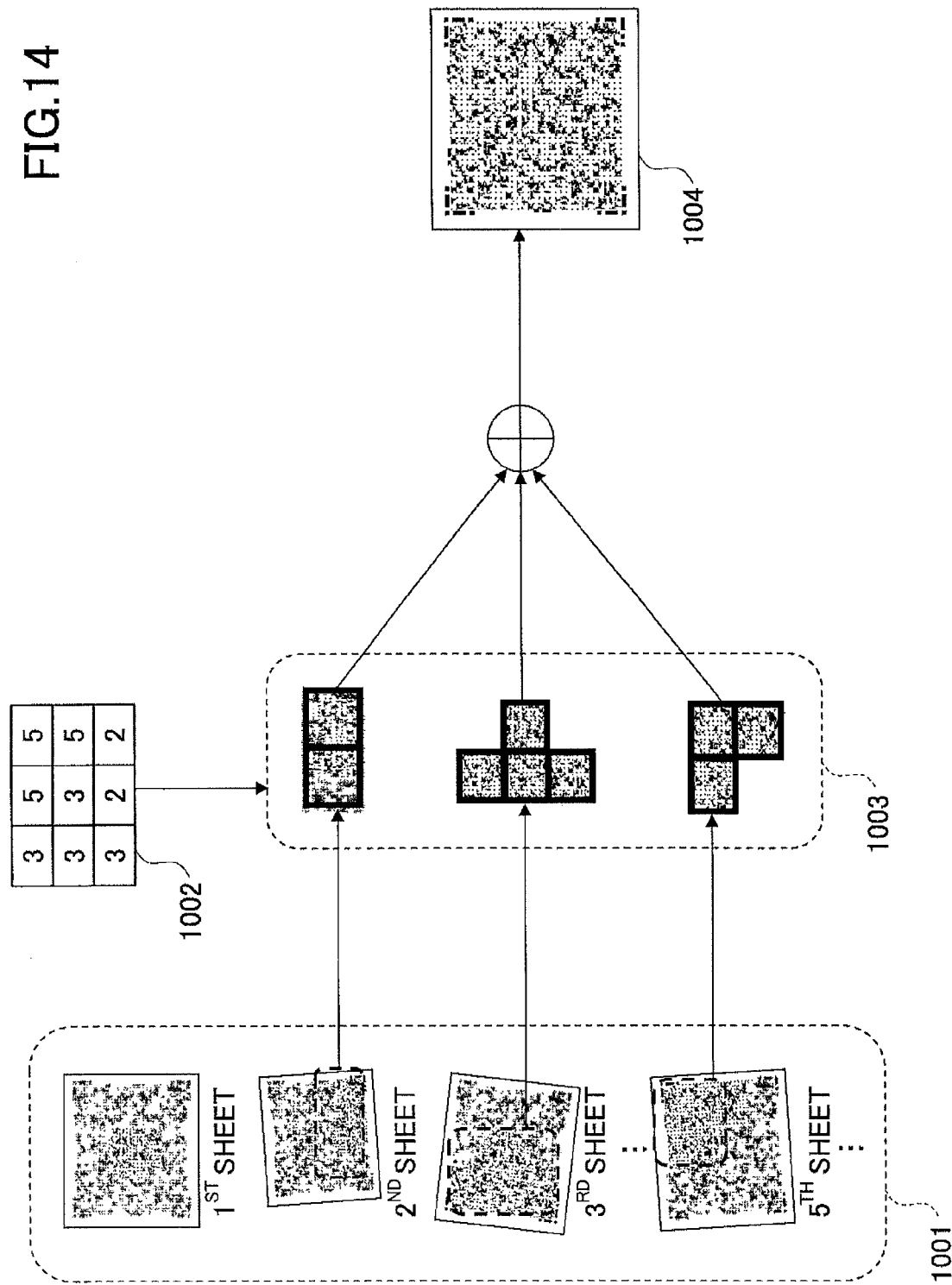
FIG. 14 is a diagram illustrating an example of an image synthesizing process performed by an image synthesis part.

FIG. 14 is a diagram illustrating an example of an image synthesizing process performed by the image synthesis part 108. An input image 1001 includes a sequence of image data obtained by capturing an identical image subject to imaging by a camera or the like at different times. The data of the block of the image selected with respect to each of the blocks are obtained, based on image information 1002 indicating which sheet number of the image the image data selected for each of the block is from, and the obtained data are normalized, thereby generating a normalized image 1003. Thereafter, the normalized images 1003 are stitched to generate an output image 1004.

Referring back to FIG. 4, the synthetic image determining part 109 determines whether the image synthesized by the image synthesis part 108 is a final image. For example, the values of image degradation information (i.e., the values of degradation level) of all the blocks are less than or equal to a threshold (e.g., less than or equal to 1.0), the synthetic image determining part 109 determines that the synthetic image is the final image. When the synthetic image determining part 109 determines that the synthetic image is the final image, the output part 110 outputs the synthetic image determined as the final image. When the synthetic image determining part 109 determines that the synthetic image is not the final image, the above-described processes are repeatedly performed utilizing image data newly input by the input part 103. Note that whether the synthetic image is a final image may, for example, be determined based not on the value of the degradation level but on the number of sheets of input images.

Hence, when the synthetic image generated by the image synthesis part 108 includes blocks having a degradation level greater than a predetermined degradation level, a process of measuring a degradation level based on the newly input image data, a process of determining the degradation level, and a process of synthesizing the image may be repeatedly performed. Accordingly, the degradation determining part 107 selects data of the block having a degradation level less than the predetermined degradation level among the blocks having the greater degradation level of one or more images newly input by the input part 103. Thereafter, the image synthesis part 108 regenerates a sheet of the synthetic image utilizing the data of the selected block having the smaller degradation level.

Figure 15:
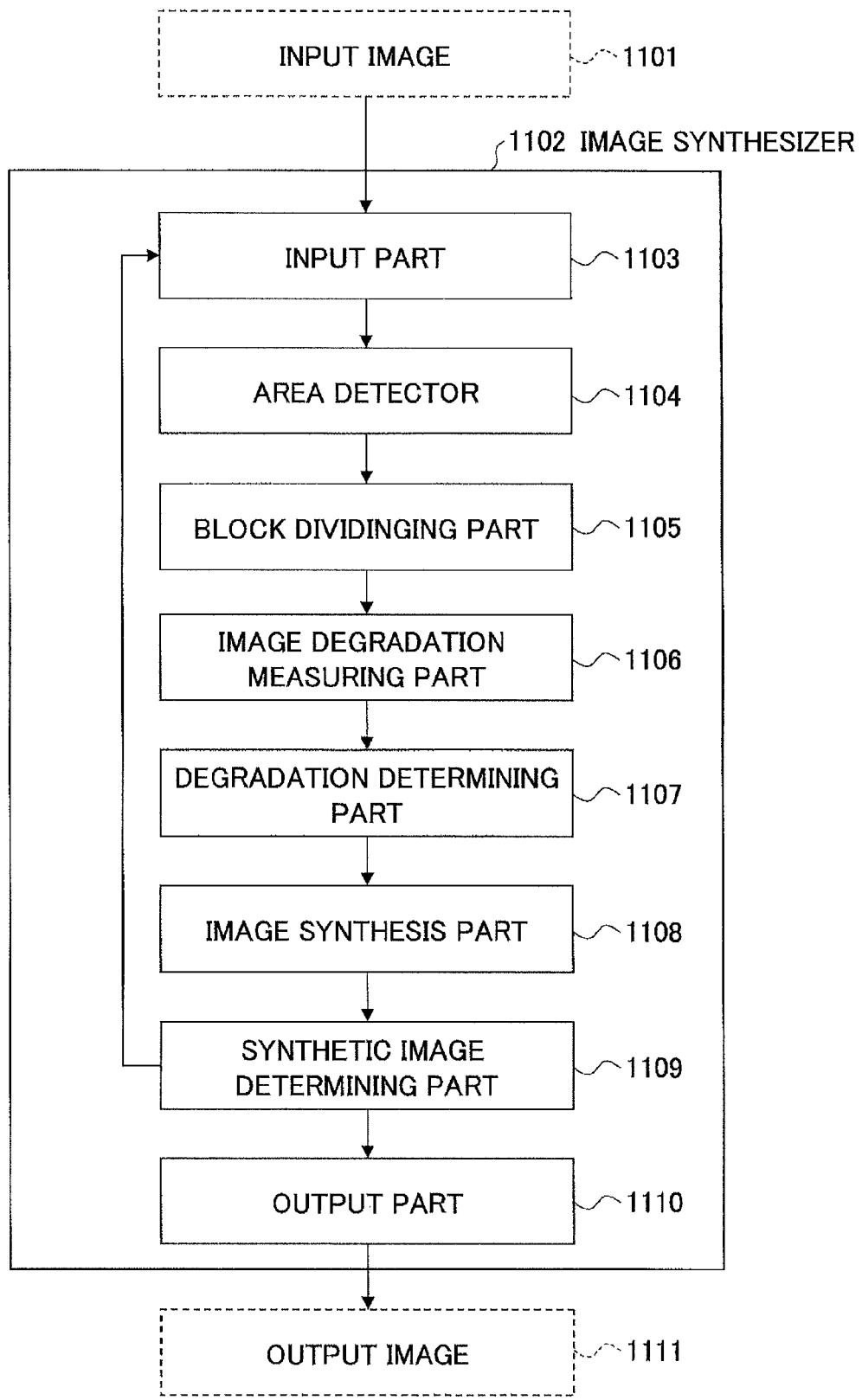
FIG. 15 is a diagram illustrating modification of a functional configuration of an image processor.

FIG. 15 is a diagram illustrating a modification of a functional configuration of an image synthesizer 1102 of an input image 1101 to produce an output image 1111. In this modification, the image synthesizer 1102 includes an input part 1103, an area detector 1104, a block dividing part 1105, an image degradation measuring part 1106, a degradation determining part 1107, an image synthesis part 1108, a synthetic image determining part 1109, and an output part 1110. The components in FIG. 15 other than the degradation determining part 1107 identical to or equivalent to the components having the same names in FIG. 4 may be performed processes identical to or equivalent to the processes performed by the components having the same names in FIG. 4.

Figure 16:
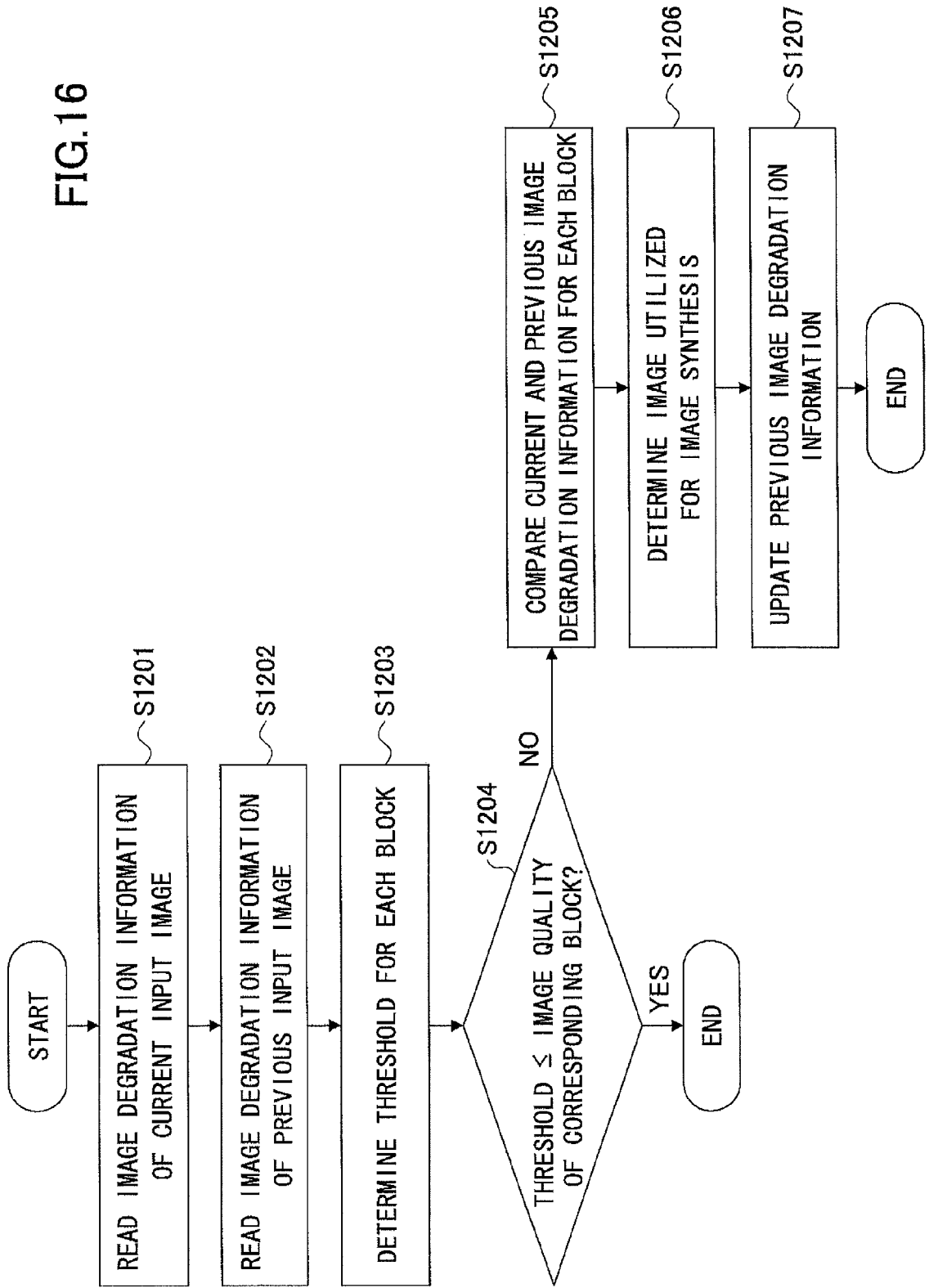
FIG. 16 is a flowchart illustrating a process performed by a degradation determining part in FIG. 15.

FIG. 16 is a flowchart illustrating a process performed by a degradation determining part in FIG. 15. In step S1201, first image gradation information of the current input image is read. In step S1202, second image gradation information of the previous input image is read. In step S1203, a threshold determination is performed for each of the blocks. In the threshold determination, whether the second image degradation information is less than or equal to a threshold is determined for each of the blocks. In step S1204, when it is determined that the target block has the second image degradation information (i.e., the degradation level) less than or equal to the threshold; that is, when the image quality is greater than or equal to the threshold, the process on the corresponding block ends. When it is determined that the target block has the second image degradation information (i.e., the degradation level) greater than the threshold based on the determination of step S1204; that is, when the image quality is less than or equal to the threshold, the first image degradation information and the second image degradation information are compared for each of the blocks in step S1205. In step S1206, the image for use in image synthesis is determined based on the above compared result. In this case, the image data corresponding to one of the first and the second image degradation information items having the degradation less than the other may be selected for used in the image synthesis. In step S1207, the previous image gradation information (i.e., the second image degradation information) is updated.

FIG. 17 is a diagram illustrating an example of the process performed by the degradation determining part in FIG. 15. Initially, the current image degradation information 1301 and previous image degradation information 1302 are compared for each of the blocks, with respect to a first sheet of an input image. Note that when the first sheet of the input image is subject to the comparing process, there exists no previous image degradation information. Hence, in this case, a greater value (=100) is given as a default (i.e., an initial value) for the previous image degradation information 1302. Image information 1303 for use in image synthesis is generated based on the comparing process for each of the blocks, such that the degradation of the synthetic image is reduced. The image information 1303 indicates which sheet number of the image is used as image data of a corresponding block for synthesis, for each of the blocks. The image information 1303 required with respect to the first sheet of the input image is "1" for all the blocks of the first sheet of the input image. That is, data of the blocks used in the synthetic image all correspond to data of the input image of the first sheet. Finally, image degradation information 1304 is updated. The image degradation information 1304 indicates the image degradation information (i.e., the degradation level) of the image data of each of the blocks indicted by the image information 1303.

Subsequently, a process is performed on a second sheet of the input image. In this case, the blocks having a value of the previous image degradation information 1306 less than or equal to a predetermined threshold (e.g., less than or equal to 1.2) are determined as the finalized selected image and the finalized value of the degradation level, and hence, the comparing operations or the updating operations for the image degradation information will not be performed. Hence, for example, since the blocks indicated by circles in the previous image degradation information 1306 have the degradation level indicating the threshold of 1.2 or less, these blocks are handled as the data being already finalized. That is, when the current (i.e., a second sheet of an input image) image degradation information 1305 and the previous image degradation information 1306 are compared for each of the blocks, with respect to the second sheet of the input image, the comparing process will not be performed on the blocks indicated by the circles. Accordingly, image information 1307 required with respect to the second sheet of the input image is "2" for the respective blocks at the lower left corner and the lower right corner and "1" for remaining blocks other than the blocks at the lower left corner and the lower right corner. As described above, the value of the encircled central block in the lower row of the image information 1307 remains unchanged as 1, which differs from the image information 807 illustrated in FIG. 12. Further, when the image degradation information 1304 is updated with image degradation information 1308, updating operations will not be performed on the blocks corresponding to the encircled blocks of the previous image degradation information 1306. As a result, the process rates may be increased by omitting the comparing operations or the updating operations on several blocks.

According to one embodiment, an image processor includes an image degradation measuring unit configured to compute a degradation level of block data with respect to each of blocks within an image; a degradation determining unit configured to select, with respect to each of the blocks within the image, the block data of a target block of one of a plurality of the images based on degradation levels of respective block data of the target blocks of the plurality of the images; and an image synthesis unit configured to generate a sheet of an image by synthesizing the block data selected with respect to the blocks within the image.

According to another embodiment, an image processing method includes computing a degradation level of block data with respect to each of blocks within an image; selecting, with respect to each of the blocks within the image, the block data of a target block of one of a plurality of images based on degradation levels of respective block data of the target blocks of the plurality of the images; and generating a sheet of an image by synthesizing the block data selected with respect to the blocks within the image.

According to at least one embodiment of the disclosures, an appropriate synthetic image subject to decoding may be generated based on the plural images containing partial degradation.

The invention is described on the basis of the embodiments described above; however, the invention is not limited to those embodiments. Various alterations and modifications may be made within the scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An image processor, comprising:
   an image degradation measuring unit configured to compute a degradation level of block data with respect to each of blocks within an image;
   a degradation determining unit configured to select, with respect to each of the blocks within the image, the block data of a target block of one of a plurality of images based on degradation levels of respective block data of the target blocks of the plurality of the images; and
   an image synthesis unit configured to generate a sheet of an image by synthesizing the block data selected with respect to the blocks within the image;
   wherein when the image synthesis unit synthesizes the respective block data, the image synthesis unit normalizes a size and a shape of each of the block data before synthesizing the respective block data to normalize the blocks for accurately stitching the blocks one to another by removing distortion while the image includes the distortion in accordance with imaging conditions.

2. The image processor as claimed in claim 1, further comprising:
   an image input unit configured to incorporate an image,
   wherein when the sheet of the image generated by the image synthesis unit includes block data of a block having a degradation level greater than a predetermined degradation level, the degradation determining unit selects block data of a block having a degradation level less than the predetermined degradation level from one or more images newly input by the image input unit with respect to the block having the degradation level greater than the predetermined degradation level, and
   the image synthesis unit regenerates a sheet of an image utilizing the selected block data of the block having the degradation level less than the predetermined degradation level.

3. The image processor as claimed in claim 1, further comprising:
   an image decoder configured to decode the sheet of the image generated by the image synthesis unit based on predetermined key information.

4. An image processing method, comprising:
   computing a degradation level of block data with respect to each of blocks within an image;
   selecting, with respect to each of the blocks within the image, the block data of a target block of one of a plurality of images based on degradation levels of respective block data of the target blocks of the plurality of the images;

generating a sheet of an image by synthesizing the block data selected with respect to the blocks within the image; and when the generating synthesizes the respective block data, normalizing a size and a shape of each of the block data before synthesizing the respective block data to normalize the blocks for accurately stitching the blocks one to another by removing distortion while the image includes the distortion in accordance with imaging conditions.

5. The image processing method as claimed in claim 4, wherein the selecting includes comparing a degradation level of the block data of a target block selected from a plurality of previous images and a degradation level of the block data of a target block of one of a plurality of current images; and determining one of the block data of the target blocks to be selected based on the compared result.

6. The image processing method as claimed in claim 4, wherein when the block data of the target block selected from a plurality of previous images indicates a degradation level greater than a predetermined degradation level, the selecting includes comparing the degradation level of the block data of the target block selected from the plurality of the previous images and the degradation level of the block data of the target block of one of a plurality of current images; and determining one of the block data of the target blocks to be selected based on the compared result, and wherein when the block data of the target block selected from the plurality of the previous images indicates a degradation level less than the predetermined degradation level, the selecting includes selecting the block data of the target block selected from the plurality of the previous images without comparing the block data of the target blocks.

7. An image processing apparatus comprising:

a processor; and a memory which stores a plurality of instructions, which when executed by the processor, cause the processor to execute:

an image degradation measuring unit configured to computing a degradation level of block data with respect to each of blocks within an image;

selecting, with respect to each of the blocks within the image, the block data of a target block of one of a plurality of images based on degradation levels of respective block data of the target blocks of the plurality of the images;

generating a sheet of an image by synthesizing the block data selected with respect to the blocks within the image; and when the generating synthesizes the respective block data, normalizing a size and a shape of each of the block data before synthesizing the respective block data to normalize the blocks for accurately stitching the blocks one to another by removing distortion.

* * * * *